(12) United States Patent
Carson et al.

(10) Patent No.: US 6,717,899 B1
(45) Date of Patent: Apr. 6, 2004

(54) OPTICAL DISC HIDDEN DATA TECHNIQUE

(75) Inventors: Douglas M. Carson, Cushing, OK (US); Henry B. Kelly, Stillwater, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 527 days.

(21) Appl. No.: 09/792,164

(22) Filed: Feb. 23, 2001

Related U.S. Application Data

(60) Provisional application No. 60/184,229, filed on Feb. 23, 2000.

(51) Int. Cl.[7] .................................................. G11B 5/76
(52) U.S. Cl. .................................. 369/59.23; 369/47.21
(58) Field of Search ........................ 369/30.05, 30.19, 369/30.25, 32.01, 33.01, 47.12, 47.21, 53.21, 53.31, 53.44, 59.23, 59.24, 59.25, 59.26, 84, 124.07, 275.3

(56) References Cited

U.S. PATENT DOCUMENTS

| | | | |
|---|---|---|---|
| 5,537,425 A | 7/1996 | Tsou | |
| 5,559,884 A | 9/1996 | Davidson et al. | |
| 5,572,589 A | 11/1996 | Waters et al. | |
| 5,663,969 A | 9/1997 | Tsou | |
| 5,930,209 A | * 7/1999 | Spitzenberger et al. | .. 369/30.05 |
| 6,104,679 A | 8/2000 | Sollish | |
| 6,157,330 A | 12/2000 | Bruekers et al. | |
| 6,208,598 B1 | * 3/2001 | Sinquin et al. | .......... 369/47.12 |

* cited by examiner

*Primary Examiner*—Paul W. Huber
(74) *Attorney, Agent, or Firm*—Fellers, Snider, et al.

(57) ABSTRACT

An optical disc having a plurality of user data written to the disc from a lead-in zone to a lead-out zone, the disc comprising a plurality of control display data composed of a plurality of subcode registers, each having a value, where the control display data are written to the disc interposed with the user data and written to the lead-out zone and hidden data encoded within one of the subcode registers in the lead-out zone. The p-bit register in the lead-out zone of the optical disc required to toggle at a rate of 2 Hz. In one second, the optical disc reader reads 75 p-bit registers, therefore a perfect 2 Hz toggling cannot be achieved. The location of a p-bit state composed of a fewer number of p-bit sector is used to represent a bit value of hidden data.

17 Claims, 4 Drawing Sheets

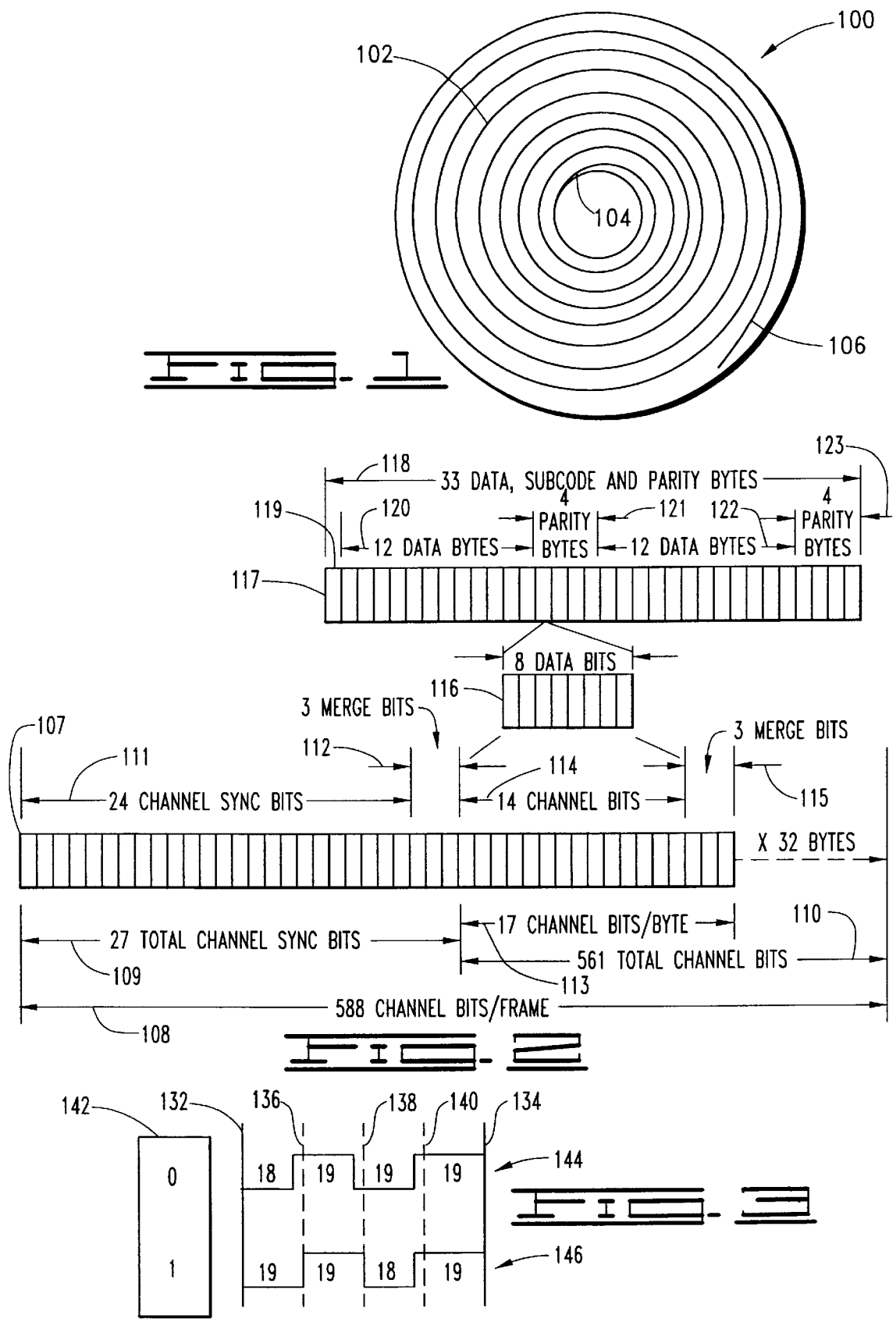

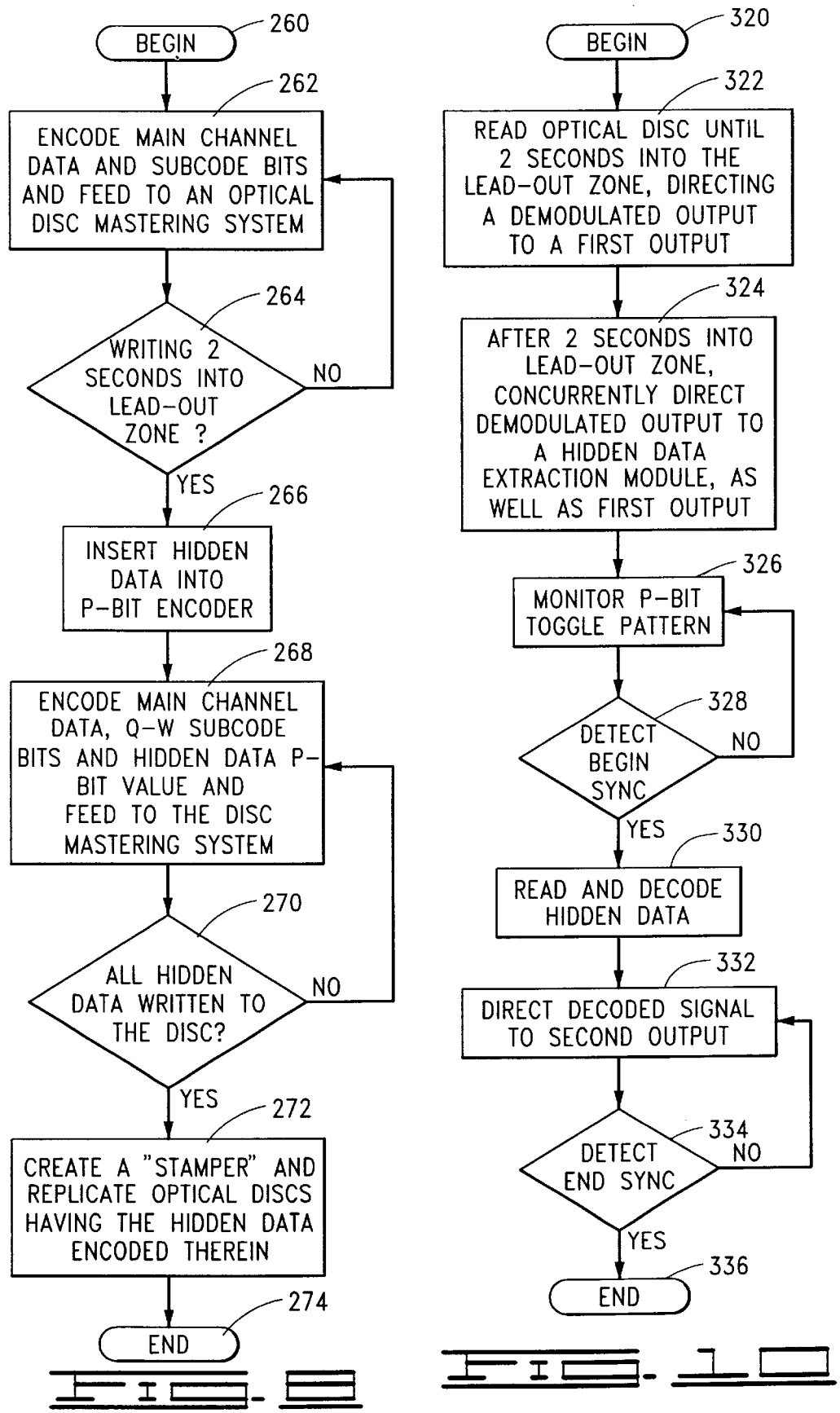

OPTICAL DISC HIDDEN DATA TECHNIQUE

RELATED APPLICATIONS

This application claims priority to U.S. Provisional Application No. 60/184,229 filed Feb. 23, 2000.

FIELD OF THE INVENTION

The present invention relates generally to the field of the placement of forensic tracking information on an optical disc and more particularly to the use of the limitations of the control and display data p-bit register in the lead-out zone to place hidden data on the optical disc.

BACKGROUND OF THE INVENTION

Optical discs have become an increasingly popular and cost-effective means for digitally storing data. A typical optical disc comprises a circular disc having a recording layer of light reflective material embedded in a refractive substrate. The recording layer is disposed along a plane substantially normal to an axis about which the disc is rotated and stores data in the form of localized pits and lands along a continuously extending spiral track. The length of the pits and lands corresponds to one of the selected number of data symbols (for example, from 3T to 11T, with T of a determined length).

The spiral track has a lead-in zone which allows the optical reading device to begin reading the user data from the disc. Following the lead-in zone is an area, usually the majority of the disc space, where the user data is written thereto. The track concludes with a lead-out zone which notifies the reading device that all the user data has been read.

The data symbols on the optical disc are recovered through the use of a light source (such as a laser) which applies light of selected wavelength to the rotating disc and a transducer which generates a readback signal indicative of the data in relation to the relative differences in reflectivity of the pits and lands. It is common to separate the relative elevations of the pits and lands by a distance equal to a quarter-wavelength of the applied light so as to facilitate a substantial change in the amount of light reflected by the pits as compared to the amount of light reflected by the lands.

One popular optical format is commonly referred to as a compact disc, or CD, which has found widespread use in recent years in computer applications (such as CD-ROM) and in the music recording industry (audio CD). Another popular optical disc format is commonly referred to as digital versatile disc, or DVD.

Due to worldwide consumer demand for the types of information available on optical discs (e.g. software and music), combined with the relative ease with which unauthorized copies of optical discs can be generated, attempts have been made to implement various copy protection schemes to restrict unauthorized replication of the discs. One type of copy protection involves configuring an optical disc such that an authorized copy will function properly in a readback machine, but an unauthorized copy is prevented from being properly read.

Another type of copy protection is the placement of hidden data or induced error on the disc, commonly known as forensic tracking. During the creation of the optical disc, information is embedded in the disc through various techniques. A common type of forensic tracking provides that if the optical disc is illegally copied, the tracking information will be copied along with the user data. Therefore, forensic tracking does not prevent unauthorized replication, but places "markings" on the replicated disc, whereby these markings may be used to determine the authenticity of the disc.

Another usage of forensic tracking is to hide proprietary information on the disc. This information is not used for verification purposes, but may be used to determine ownership and other rights, should an unauthorized copy be found.

A CD has an outer diameter of 120 millimeters (4.724 inches) and a data storage capacity of about 650 megabytes (MB). On a standard CD, 588 channel pits compose 1 frame. This frame, a raw data frame, is comprised essentially of a sync block, a control display symbol block, two Data blocks and two parity blocks.

The control display block is further composed of an 8-bit subcode block. The blocks are designated as P, Q, R, S, T, U, V and W,. commonly referred to as the PQ codes. The CD player collects a single set of subcode symbols from ninety-eight consecutive frames to form a subcode block with eight 98-bit words. Only the P and Q bits are used in audio CDs, whereas the other bits are available for encoding other information.

The p-bits were designed to be used as a simple pointer to the pauses in between audio tracks, the idea being that inexpensive CD audio players could "skip" to the next pause point instead of having to fully decode the Q channel which contains specific information such as the total number of selections on the disc, their beginning and ending points and timings, and lead-in and lead-out point. Most modern CD readers no longer use the p-bit information for seeking purposes.

The p-bit also has been designated to toggle on and off at a rate of two (2) Hz beginning two seconds after the lead-out zone has been reached and continuing until the end of the disc. Due to the physical limitations of the optical disc, combined with the two (2) Hz toggle rate, a problem exists in having the p-bit toggle properly. The optical disc reader reads seventy-five (75) sectors per second. The p-bit must make four state changes, such as ON to OFF, OFF to ON, ON to OFF and OFF to ON, within this time. As four states changes cannot be evenly divided between seventy-five sectors, where a sector is a full raw data frame having one subcode per frame, a perfectly symmetrical 2 Hz toggle cannot be achieved.

Several solutions have been implemented to provide this 2 Hz toggling of the p-bit register. One possible solution is inserting one state having one less sector than the other three states. For instance, it is possible to write the first 18 consecutive sectors of the p-bit in the ON state, write the following 19 sectors in the OFF state, the following 19 sectors in the ON state and the final 19 sectors in the OFF state. This gives an 18/19/19/19 sector toggle pattern. It is also possible to place the 18 sector state at any other point, provided the other states maintain 19 sectors. Thus, the seventy-five sectors are used to provide the proper 2 Hz toggle of the p-bit register.

Another possible solution is writing every state as having a total of 19 sectors before transition. Therefore, a sector toggle pattern would be 19/19/19/19. This solution produces a p-bit signal that toggles slightly over 2 Hz.

The 2 Hz toggle of p-bit register in the lead-out zone is a CD standard, thus all CDs must have the p-bit properly toggle within the lead-out zone. As the p-bit fails to contain any user information, only switching from ON to OFF or OFF to ON, this location is often overlooked as containing any forensic tracking information. It is to the placement of forensic tracking information using the p-bit register toggling requirement in the lead-out zone of an optical disc that the present invention is directed.

SUMMARY OF THE INVENTION

The present invention provides for the placement of forensic tracking information on an optical disc without compromising the integrity of the user data or the disc itself. The physical limitations of the disc, as they relate to standardization requirements, provide the requisite medium for encoding hidden forensic data. An optical disc of the present invention contains forensic tracking information in its lead-out zone created by the pattern of oscillating transition states used to create an oscillating signal at a specified frequency.

The preferred embodiment of the present invention provides for the placement of a forensic tracking message in a data string. The contents of the data string are encoded on the lead-out zone of the optical disc by p-bit toggle patterns that produce a nominal 2 Hz square wave.

As the 2 Hz p-bit lead-out toggle may be created by placing an 18 sector state amongst three 19 sector states, the location of the 18 sector state may be used for forensic purposes. The four possible sector arrangements, (18/19/19/19, 19/18/19/19, 19/19/18/19, 19/19/19/18), may be used to represent an encoded forensic message. In this embodiment, there are two groupings through which the hidden data may be encoded. Each grouping provides for the representation of a first value, such as "0" and a second value "1" which may be used to create a binary representation of the hidden data. The first grouping provides for the 18 sector state to always be located in an odd numbered position, either the first or third position, in the sector state sequence. The second grouping provides for the 18 sector state to always be located in the even numbered position, either the second or fourth position, in the sector state sequence. Thus, an unauthorized user will be less likely to detect the encoded data within the p-bit toggle as the toggling pattern will be more standardized.

The preferred embodiment further provides for the placement of error correction codes in the encoded message. The error correction codes are inserted prior to modulation and provide greater accuracy in the subsequent decoding of the hidden data. Also, the preferred embodiment provides for the writing of a begin-synchronization pattern and an end-synchronization pattern in the p-bit registers before and after the hidden data, respectively. Therefore, a hidden data extraction device may better determine the location of the forensic tracking information and insure a more accurate detection of the encoded data string.

Another embodiment of the present invention also provides for the placement of a forensic tracking message on the optical disc. The forensic tracking information is encoded on the lead-out zone of the optical disc by four distinct toggle patterns. The encoded data string itself is composed of four different values, such as "00", "01", "10" and "11". These values are represented by different p-bit toggle patterns designed by the location of the 18 sector state with respect to the 19 sector states.

Also, the present invention provides for the transferring of the forensic tracking information through the creation of an optical disc having the hidden data encoded in the lead-out zone during the mastering process. A special encoder is used, in conjunction with a modulator, to provide a write signal to a disc mastering system having the forensic tracking information encoded and modulated therein. A disc master is produced in accordance with normal mastering procedures. All replicated discs thus contain the encoded forensic tracking information in the lead-out zone where the forensic information does not interfere with the normal operation of the optical disc.

A second aspect of the transferring of forensic tracking information with an optical disc created in accordance with the present invention is the extraction of the hidden data. The optical disc reader is directed to read the lead-out zone. A hidden data extraction module is used to specifically look for the forensic tracking information. In the preferred embodiment, the module will locate the begin-synchronization pattern and begin extracting the data string.

The module reads the p-bit toggle pattern, noting the location of the 18 sector state amongst the 19 sector states to determine the corresponding bit pattern of the encoded message. Once the end synchronization pattern is found, the module discontinues reading the p-bit toggle pattern, unless another begin synchronization pattern is found. The p-bit toggle pattern is used to represent the encoded hidden data, which is then decoded, providing the forensic tracking information.

Thus, without knowledge of the hidden data encoding scheme, a normal user may be able to detect the patterns in the p-bit 2 Hz toggle, but will unable to read the forensic tracking information. Furthermore, the hidden data is located within a standard toggle pattern thus the integrity and data content of the optical disc is not compromised.

BRIEF DESCRIPTION OF THE DRAWINGS

FIG. 1 is an optical disc having an exaggerated view of a spiral data track.

FIG. 7 is a representation of a modulation system used to create an optical disc having encoded hidden data written to the p-bit register in the lead-out zone.

FIG. 8 is a flow chart illustrating the steps of writing the forensic tracking information in the p-bit register.

FIG. 9 is a representation of a disc reading device having the ability to read and decode the hidden data.

FIG. 10 is a flow chart illustrating the steps taken to extract the encoded hidden data.

DETAILED DESCRIPTION

Figures 4, 5, 6:
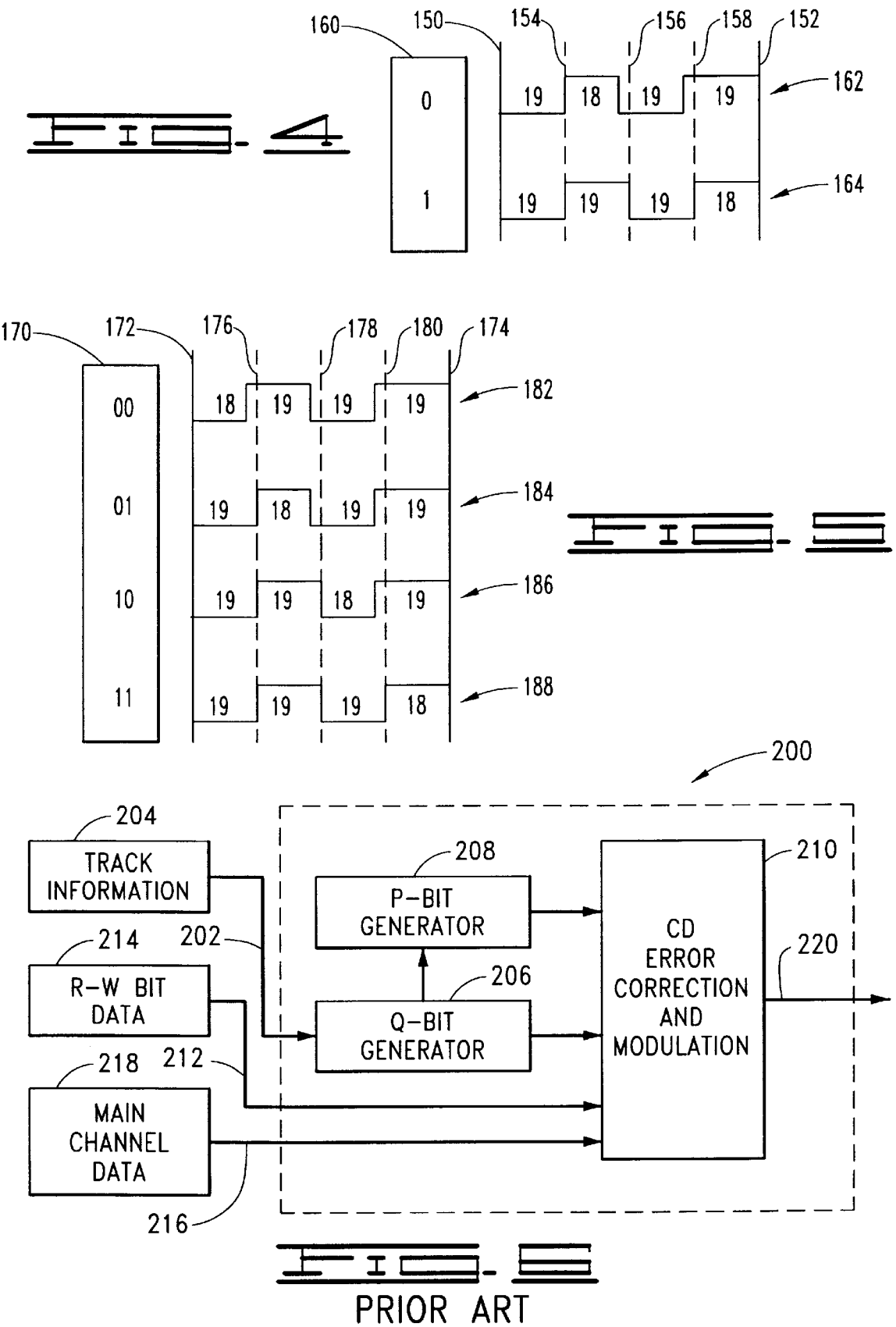
FIG. 4 is a representation of a second grouping of p-bit sector states representing encoded hidden data bits, in accordance with the preferred embodiment.
FIG. 5 is a representation of another embodiment of p-bit sector states representing encoded hidden data bits.
FIG. 6 is a representation of a prior art modulation system used to modulate user data to be written to a disc master system.

The present invention is directed to the placement of forensic tracking information in an oscillating signal portion, such as the lead-out zone on an optical disc. Through the use of a plurality of p-bit registers toggling at 2 Hz in the lead-out zone, forensic tracking information is encoded and written to the disc.

A normal optical disc 100, as illustrated in FIG. 1, contains a continuously extending track 102 of user data, extending spirally from a lead-in zone 104 to a lead-out zone 106. A normal optical disc reader uses the lead-in zone 104 to begin reading the disc, and uses the lead-out zone to determine the end of the user data 102, and the end of the disc 100 itself.

Figure 2:
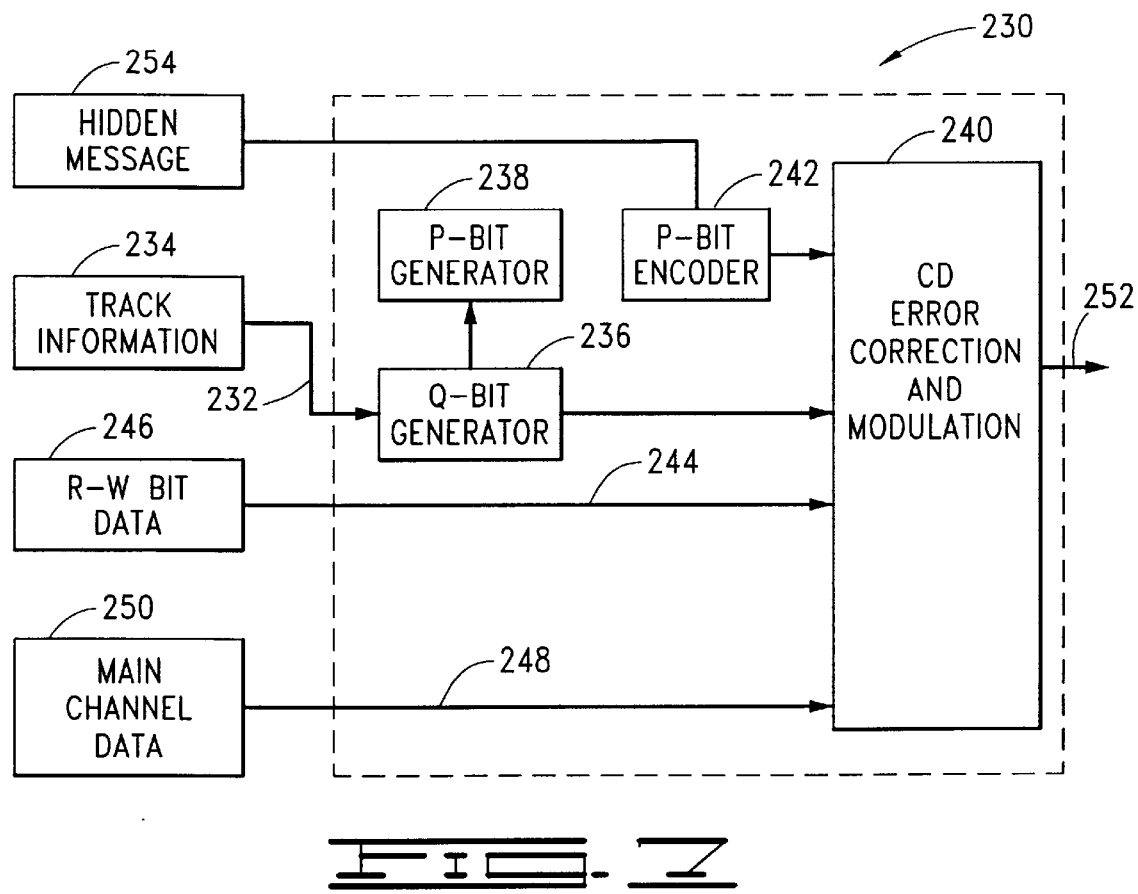
FIG. 2 is a representation of a data frame.

FIG. 2 illustrates a portion of a single frame 107 which is composed of 588 channel bits 108. The actual frame is composed of a total of 27 channel sync bits 109 and 561 channel data bits 110. The total channel sync bits 109 are composed of 24 channel sync bits 111 and 3 merge bits 112. After these total sync bits 109, the 561 data bits 110 are composed of 33 separate 17 bit segments 113. These 17 bits segments are composed of 14 channel data bits 114 and 3 merge bits 115. The first two merge bits, of the three merge bits are used to prevent any violations of the optical disc run length limitations scheme. The third merge bit is added to aid in clock synchronization and to assist in the suppression of any low-frequency components of an output signal.

Also illustrated in FIG. 2 is the representation of the 14 channel bits 114 prior to being encoded using an EFM modulation encoding scheme. The 8 data bits 115 represent the 14 channel data bits prior to modulation. Shown at 117, the data, with the subcode and parity bytes therein, are composed of 33 bytes consisting of a subcode byte 119, 12 bytes of user data 120, 4 parity bits 121, another 24 bytes of user data 122 and 4 more parity bits 123.

The eight bit box 116 represents one of the 33 data bytes, which is encoded from its 8 bit to a 14 bit representation and written to the channel in 14 bit format 114. Therefore, all 33 data bytes are converted into 14 bit representations 114 and combined with 3 merge bits 115 each to compose the user data portion 110 of the frame 107. As only one of the 33 bytes of box 117 contains subcode, block 119, every frame 107 contains exactly one of each of the subcode registers, more specifically a single p-bit register. The data is read at a rate of 75 frames per second, therefore, the reading device will read 75 p-bit registers per second, one from each frame.

The present invention is directed to the placement of forensic tracking information within the subcode registers in the lead-out zone of the disc. According to audio CD encoding standards, the information written to the lead-out zone contains a 2 Hz toggling of the p-bit register, one of the subcode registers 114. As discussed above, due to the frequency of the optical reading device reading seventy five (75) bits per second, it is impossible to create a perfectly symmetrical 2 Hz toggle having four transition states.

It is in the use of this anomaly whereupon the encoded hidden data may be written. By utilizing an encoding scheme that may be translated onto the optical disc, the forensic tracking information is encoded. The encoded data may then be written to the optical disc using the 2 Hz toggling pattern of the p-bit register. As discussed above, four possible sector state scenarios exist which provide the mandatory 75 sectors. The four variant locations of the 18 sector state amongst the three other 19 sector states, may be used to represent the encoded data to be hidden on the disc.

Figure 3:
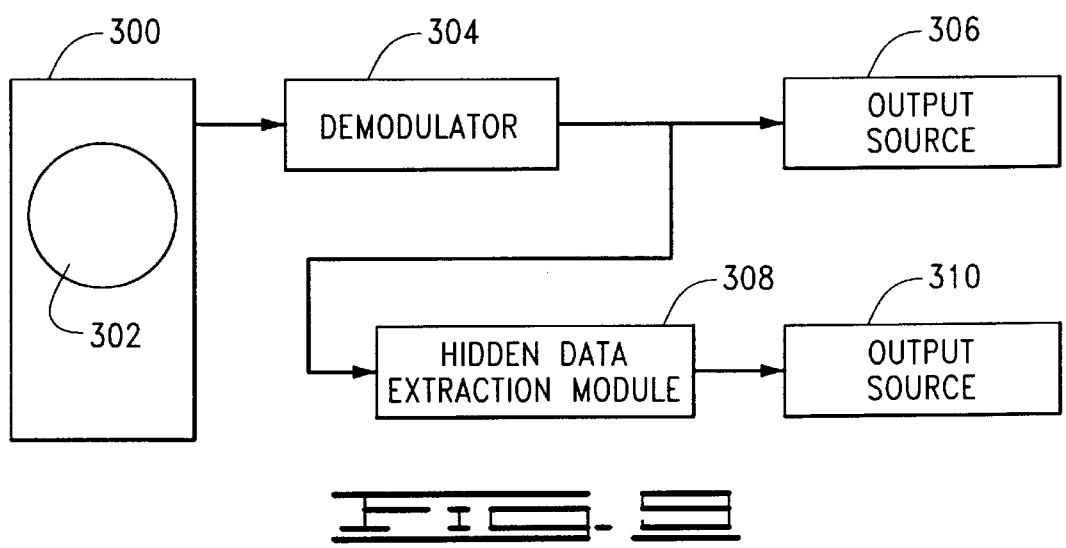
FIG. 3 is a representation of a first grouping of p-bit sector states representing encoded hidden data bits, in accordance with the preferred embodiment.

FIGS. 3 and 4 represent the preferred encoding scheme used to place hidden data on the toggling p-bit register of the lead-out zone. This encoding scheme creates a possible of two different values, a first value. such as "0", and a second value, such as "1", within two different possible bit groupings.

The first bit grouping, group "A" is represented by FIG. 3 as always having the eighteen state sector in the odd state position, either the first state or the third state. The second bit grouping, group "B" is represented by FIG. 4 as always having the eighteen state sector in the even state position, either the second state of the fourth state.

More specifically, FIG. 3 provides the identification lines 132 and 134 representing one full interval of 75 sectors, which corresponds to a 2 Hz output signal. Also included are interval markers 136, 138 and 140, illustrating intervals of 19 sectors between transition states, except the final interval between lines 140 and 134 which is represented as an interval of 18 sectors, providing the overall 75 sector sample.

Within group "A" there are two possible bit grouping sequences correlating to a respective reference value. Shown in table 142, the two possible values are a first value "0" and a second value "1". The first value is represented by a bit grouping having 4 state transitions within a period of 75 sectors, composed of 18 consecutive sectors in a first state, followed by 19 consecutive sectors in the second state, 19 consecutive sectors in the first state and concluding with 19 consecutive sectors in the second state, represented as (18/19/19/19) 144. The second value is represented by a bit grouping also having 4 state transitions within a period of 75 sectors, composed of 19 consecutive sectors in a first state, followed by 19 consecutive sectors in a second state, followed by 18 consecutive sectors in the first state and concluding with 19 consecutive sectors in the second state, represented as (19/19/18/19) 146. Therefore, when the hidden data is written to the p-bit in the lead-out zone, since the 18 sector state is always in the odd position, it will be harder to detect the presence of an encoded pattern written therein.

Similar to FIG. 3, FIG. 4 illustrates the bit grouping for group "B". Shown therein are the identification lines 150 and 152, representing a total interval of 75 sectors, providing a 2 Hz signal. Also included are interval markers 154, 156 and 158, illustrating intervals of 19 sectors apart, except for the final interval 158 to 152 which is only 18 sectors in length.

Group "B" also provides for 2 different reference values, as seen in table 160. The first value, "0" 162, is represented by a bit grouping having 4 state transitions within a period of 75 sectors, composed of 19 consecutive sectors in the first state, followed by 18 consecutive sectors in the second state, 19 consecutive sectors in the first state and concluding with 19 consecutive sectors in the second state, represented as (19/18/19/19) 160. The second value, "1" 164, is represent by a bit grouping having 4 state transitions within a period of 75 sectors, composed of 19 consecutive sectors in the first state followed by 19 consecutive sectors in the second state, 19 consecutive in the first state and concluding with 18 consecutive sectors in the second state, represented as (19/19/19/18). Therefore, when the hidden data is written into the p-bit register in the lead-out zone, since the 18 sector state is always in the even position, it will be harder to detect the presence of an encoded pattern written therein.

It should also be noted, the discussion of the preferred embodiment, as well as other embodiments, is predicated on transitions from a first state to a second state and from a second state to a first state. The associated drawings, FIGS. 3–5, illustrate the first sector segment in a first state, but the present invention is predicated on the transition between states, therefore, it is fully within the scope of the present invention to reverse the states, whereas the first interval is in the second state, the second interval is in the first state, the third interval is in the second state, and the final interval is in the first state.

Also within the preferred embodiment, a packet of binary data, whether in grouping "A" or "B" would begin and end with a synchronization pattern or mark, making the detection of the hidden data easier for a device monitoring the optical reader output signal for the encoded data. Similar to a bar code scanner, a hidden data reading device may monitor the output of the p-bit 2 Hz oscillation signal, seeking to detect a begin synchronization pattern.

Upon reading the begin synchronization pattern, the device then begins monitoring the cycle of the 2 Hz oscillation, determining the location of the 18 sector state in relation to the other 3 states of 19 sectors. The p-bit toggling in monitored, extracting the encoded hidden data until an end synchronization pattern is found. Any form of synchronization pattern may be used to denote the beginning and the ending of the encoded hidden data, as long as it does not violate the 2 Hz oscillation requirement.

Another aspect of the preferred embodiment is the placement of error correction code with hidden data. The hidden data, prior to modulation, is provided with the error correction codes and is modulated with the code embedded therein. Therefore, the final encoded data string may be decoded with a greater degree of accuracy.

To better illustrate the preferred embodiment, the following is an example of the encoding of sample forensic tracking information in the p-bit toggle pattern in the lead-out zone. An example of hidden data may be "® 1999". This data is converted to a binary data string. Using an 8-bit sample, the data may be represented as [11010100], having the error correction codes encoded therein.

In accordance with preferred embodiment, the hidden data may also contain a begin synchronization pattern, such as [1111] and an end synchronization pattern [0000]. Therefore, the total hidden data string, with synchronization patterns, would be [1111][11010100][0000]. As there are sixteen (16) different values to be represented, the total encoded message will take 16 different frames of 75 sectors, or a total of 16 seconds of optical disc reading time.

Assuming the signal uses group "A", the p-bit oscillation pattern will be as follows: [19/19/18/19 19/19/18/19 19/19/18/19 19/19/18/19] [19/19/18/19 19/19/18/19 18/19/19/19 19/19/18/19 18/19/19/19 19/19/18/19 18/19/19/19 18/19/19/19] [18/19/19/19 18/19/19/19 18/19/19/19 18/19/19/19]. Furthermore, the spacing between sector intervals and the brackets between the synchronization patterns and the data string are for clarity purposes only.

Therefore, in reading the p-bit registers, a normal optical disc will properly toggle at a rate of 2 Hz and be unaffected by the presence of the forensic tracking information. An optical reading device searching for this information will be able to read the p-bit registers of the lead-out zone and extract the encoded data. Furthermore, without knowledge of the encoding scheme, should an unauthorized user detect the presence of the forensic tracking information, the user will be unable to decode the hidden data.

Another encoding scheme of the present invention is represented by FIG. 5 and may be used to create four different values to be encoded using the p-bit registers. These values are represented in table 170. Furthermore, FIG. 5 illustrates the p-bit sector sequence relating to each of these four values. For further illustration, lines 172 and 174 mark a one-second interval created by a total of 75 sectors whereas lines 176, 178 and 180 denote 19 sector intervals with the interval between 180 and 172 denoting 18 sectors.

The first value "00" 182 is represented by the placement of the 18 sector interval in the first position, having the following p-bit sector sequence 18/19/19/19. The second value "01" 184 is represented by the placement of the 18 sector interval in the second position, having the following p-bit sector sequence 19/18/19/19. The third value "10" 186 is represented by the placement of the 18 sector interval in the third position, having the following p-bit sector sequence 19/19/18/19. The fourth value "11" 188 is represented by the placement of the 18 sector interval in the final position, having the following p-bit sector sequence 19/19/19/18.

To better illustrate this encoding scheme, assume a portion of the hidden data is an 8-bit number, such as 10001101. This value is written in the p-bit toggle pattern by the p-bit consisting of the following patterns, 10-00-11-01, which translates into p-bit sector patterns of [19/19/18/19 18/19/19/19 19/19/19/18 19/18/19/19].

Furthermore, the second embodiment may also be written to the optical disc lead-out zone through the p-bit registers with the inclusion of a begin synchronization pattern and an end synchronization pattern. The encoded data may also be modulated to contain any error correction code, as discussed above.

As the above discussion discloses the manner in which the hidden data is encoded onto the optical disc through the p-bit register in the lead-out zone, the current discussion will now focus on the process of transferring the hidden data through writing the encoded data to the disc and extracting the data therefrom.

The first step is the writing of hidden data onto an optical disc using a standard disc mastering system. The writing of the hidden data is facilitated by the insertion of the encoded data p-bit sequence, in lieu of the normal p-bit sequence prior to the modulation of the user data and subcode sequence to be provided to the disc mastering system.

FIG. 6 illustrates a prior art data encoding device 200 used to encode user data, along with error correction codes and subcode data. The encoding device 200 receives several input streams, a first input stream 202 is the track information 204, which is fed to a Q-bit generator 206. This generator 206 provides the track information to the P-bit generator 208, whereupon both the Q-bit generator 206 and the P-bit generator 208 generate their respective bit values and input these values to a CD Error Correction and Modulation module 210.

The module 210 also receives a second input stream 212 of the remaining control display subcode bits, the R-W bits 214, and a third input stream 216, the user data, from a main channel data source 218. The CD Error Correction and Modulation module 210 produces error correction codes for the user data, combines the input streams and modulates the signal to create an output signal 220, which may be provided to a disc mastering system.

FIG. 7 illustrates the optical disc data encoding system 230 used to create an optical disc having forensic tracking information hidden within the p-bit registers of the lead-out zone. The system 230 has four separate input sources. The first input 232 provides track information 234 to a Q-bit generator 236, which is also provided to a P-bit generator 238. The Q-bit generator generates the appropriate Q-bit information and feeds the bit value to a CD Error Correction and Modulation module 240. The P-bit generator 238 generates a p-bit and also feeds the bit value to the module 240, but the signal is first processed through a P-bit Encoder 242 prior to entering the module 240.

The second input source 244 for the encoding system 230 provides the other control display subcode bits, the R-W bits 246. The bits are inputted into the CD Error Correction and Modulation module 230. The third input source 248 feeds the main channel data 250, the user data, to the module 240 whereupon, the module creates the proper error correction codes and modulates the combined inputs. Similar to the prior art module 216 of FIG. 6, the module 240 produces a modulated output signal 252, which may be fed to a disc mastering system to create a disc master.

Once the main channel data 250 has been fully modulated and directed from the encoding system 230, the lead-out zone is created. Any time after two full seconds of lead-out zone have been produced by the encoding system 230, the forensic tracking information may be encoded and modulated within the output signal 252.

The hidden message 254 is fed to the P-bit encoder 242. The P-bit encoder 242 encodes the hidden message according to a modulation encoding scheme, as discussed above, and interposes the encoded data p-bit pattern to the module 240, in lieu of the p-bit value generated by the P-bit generator 238.

Thereupon, the CD Error Correction and Modulation module 240 modulates the lead-out zone containing the encoded hidden data and provides this signal to a disc mastering system to be written on an optical disc master. Furthermore, the hidden message 254, through the P-bit encoder 242, complies with all lead-out zone p-bit requirements by toggling at the rate of 2 Hz. Therefore, the integrity of an optical disc having the encoded data written therein is not compromised, nor is the location of the forensic tracking information readily apparent to an unauthorized end user.

FIG. 8 provides a flow chart, through steps 260–274, through which an optical disc having forensic tracking information encoded therein, in accordance with the preferred embodiment of the present invention, is created.

Another step in the transferring of hidden data using p-bit registers in the lead-out zone is the reading and decoding of the hidden data from the optical disc. Once the optical disc reader begins reading the lead-out zone, a hidden data extraction device may monitor the p-bit toggle pattern for the hidden data. FIG. 9 illustrates a manner in which the hidden data may be extracted without interfering with normal disc operations.

The system of FIG. 9 provides an optical disc reader 300 which reads a standard optical disc 302, such as an audio disc. The reader 300 reads the main channel data, which produces an output signal 304 that is fed to a demodulator 306. The demodulator utilizes the error correction codes and reconstructs the original user data, along with the control display codes.

Once the signal is properly demodulated by the demodulator 304, the user data is provided to an output source 306, such as an audio speaker in the case of an audio disc or a computer processor in the case of a CD-ROM. At the end of the optical disc, once all the user data has been read, the reader will encounter the lead-out zone. This zone contains the hidden data, therefore a hidden data extraction module 308 is used to detect and extract the forensic tracking information.

The module 308 monitors the p-bit toggle pattern for a begin synchronization pattern. Once this pattern is detected, the module 308 reads and decodes the p-bit toggle pattern. This is continued until the end synchronization pattern is found. Furthermore, the module 308 reconstructs the hidden data using the encoded error correction codes and provides the decoded hidden data to an output source 310, such as a video display monitor or an audio speaker.

As the hidden data is extracted, the optical disc reading device will continue to read the lead-out zone. As the encoded p-bit sequence conforms with proper CD standards, the optical reading device will be unaffected by the presence of the hidden data. Furthermore, a normal user will be unaware of the existence of the hidden data due to the discs conformity with optical disc standards. Also, should an unauthorized user seek to decode the hidden data, the user will be unable to decode the hidden data without knowledge of the encoding scheme.

The present invention provides for the placement of forensic tracking information in the lead-out zone of a normal optical disc. The hidden data is encoded through an existing anomaly of the standard requirement for a p-bit register to toggle at a rate of 2 Hz during the lead-out zone. Therefore, the hidden data does not disrupt or degrade the integrity of the optical disc. Furthermore, the hidden data is written such that a normal user is unaware of its presence, and is unable to read or decode the hidden data without knowledge of the hidden data encoding scheme.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. An optical disc comprising user data written to the disc from a lead-in zone to a lead-out zone and subcode registers which store control display data, the subcode registers comprising a plurality of p-registers in the lead-out zone in which hidden data are encoded.

2. The optical disc of claim 1, wherein the plurality of p-registers in the lead-out zone in which the hidden data are encoded store an oscillating pattern at a nominal frequency, and wherein the hidden data are expressed in relation to locations of transitions in said oscillating pattern.

3. The optical disc of claim 1, wherein the hidden data comprises:
   a first value composed of a first plurality of intervals of p-bit registers in the first state and the second state; and
   a second value composed of a second plurality of intervals of p-bit registers in the first state and the second state.

4. The optical disc of claim 3, wherein the hidden data further comprises:
   a third value composed of a third plurality of intervals of p-bit registers in the first state and the second state; and
   a fourth value composed of a fourth plurality of intervals of p-bit registers in the first state and the second state.

5. The optical disc of claim 1, wherein the hidden data comprises a plurality of intervals of seventy-five consecutive p-bit registers in a first state and a second state where the intervals represent a first value and a second value.

6. The optical disc of claim 5 wherein the hidden data further comprises:
   a first grouping comprising:
      the first value represented as eighteen consecutive p-bit registers in a first state followed by nineteen consecutive p-bit registers in the second state followed by nineteen consecutive p-bit registers in the first state and concluded by nineteen consecutive p-bit registers in the second state; and
      the second value represented as nineteen consecutive p-bit registers in a first state followed by eighteen consecutive p-bit registers in the second state followed by nineteen consecutive p-bit registers in the first state and concluded by nineteen consecutive p-bit registers in the second state; and a second grouping comprising:
  the first value represented as nineteen consecutive p-bit registers in a first state followed by nineteen consecutive p-bit registers in the second state followed by eighteen consecutive p-bit registers in the first state and concluded by nineteen consecutive p-bit registers in the second state; and
  the second value represented as nineteen consecutive p-bit registers in a first state followed by nineteen consecutive p-bit registers in the second state followed by nineteen consecutive p-bit registers in the first state and concluded by eighteen consecutive p-bit registers in the second state.

7. The optical disc of claim 5 wherein the hidden data further comprises:
  the first value represented by eighteen consecutive p-bit registers in a first state followed by nineteen consecutive p-bit registers in the second state followed by nineteen consecutive p-bit registers in the first state and concluded by nineteen consecutive p-bit registers in the second state;
  the second value represented by nineteen consecutive p-bit registers in a first state followed by eighteen consecutive p-bit registers in the second state followed by nineteen consecutive p-bit registers in the first state and concluded by nineteen consecutive p-bit registers in the second state;
  a third value represented by nineteen consecutive p-bit registers in a first state followed by nineteen consecutive p-bit registers in the second state followed by eighteen consecutive p-bit registers in the first state and concluded by nineteen consecutive p-bit registers in the second state; and
  a fourth value represented by nineteen consecutive p-bit registers in a first state followed by nineteen consecutive p-bit registers in the second state followed by nineteen consecutive p-bit registers in the first state and concluded by eighteen consecutive p-bit registers in the second state.

8. In an optical disc in which user data are stored in sectors and control data are stored in control fields interspersed with the sectors to control readback of the user data, the control data comprising an oscillating pattern at a nominal frequency when a plurality of the control fields are sequentially read, the improvement comprising hidden data stored on the optical disc in relation to respective interval lengths of the oscillating pattern.

9. The improvement of claim 8, wherein the oscillating pattern is stored in a lead-out zone of the optical disc.

10. The improvement of claim 9, wherein the control fields in which the hidden data are stored comprise p-bit registers.

11. A method for transferring hidden data to an optical disc, comprising:
  providing main channel data and control channel data for placement onto the disc into corresponding sectors and control fields, respectively, the control channel data comprising an oscillating pattern which provides a selected readback frequency when a plurality of the control fields are subsequently read;
  selectively altering interval lengths in the oscillating pattern to embed the hidden data while nominally maintaining the selected readback frequency; and
  writing the selectively altered oscillating pattern to the disc.

12. The method of claim 11, wherein the writing step comprises writing the selectively altered oscillating pattern hidden data to a lead-out zone of the optical disc.

13. The method of claim 11, wherein the writing step comprises writing the selectively altered oscillating pattern to p-bit registers on the disc.

14. The method of claim 11, wherein the writing step further comprises writing the main channel data and remaining portions of the control channel data to the disc.

15. The method of claim 11, wherein the nominal readback frequency of the providing step comprises about 2 kHz.

16. The method of claim 11, wherein the writing step comprises writing bits in a subset of sequential control fields at a first logical level and writing bits in a subsequent subset of sequential control fields at a second logical level.

17. The method of claim 11, further comprising a step of recovering the hidden data by reading the plurality of control fields associated with the selectively altered oscillating pattern and determining associated intervals between successive transitions in said pattern.

* * * * *